(12) United States Patent
Rooyakkers

(10) Patent No.: US 10,005,577 B2
(45) Date of Patent: Jun. 26, 2018

(54) ARTICLE STACKING AND PACKAGING SYSTEM

(75) Inventor: Michael Rooyakkers, Combined Locks, WI (US)

(73) Assignee: Valley Tissue Packaging, Inc., Kaukauna, WI (US)

(*) Notice: Subject to any disclaimer, the term of this patent is extended or adjusted under 35 U.S.C. 154(b) by 707 days.

(21) Appl. No.: 13/558,512

(22) Filed: Jul. 26, 2012

(65) Prior Publication Data

US 2014/0026524 A1    Jan. 30, 2014

(51) Int. Cl.
| | |
|---|---|
| *B65B 35/00* | (2006.01) |
| *B65B 35/58* | (2006.01) |
| *B65B 35/50* | (2006.01) |
| *B65G 57/02* | (2006.01) |
| *B65G 57/03* | (2006.01) |
| *B65G 57/06* | (2006.01) |
| *B65B 25/14* | (2006.01) |

(52) U.S. Cl.
CPC ............ *B65B 35/58* (2013.01); *B65B 25/146* (2013.01); *B65B 35/50* (2013.01); *B65G 57/02* (2013.01); *B65G 57/035* (2013.01); *B65G 57/06* (2013.01)

(58) Field of Classification Search
CPC ..... B65B 35/50; B65B 25/146; B65B 59/005; B65B 59/04; B65B 35/44; B65B 35/52; B65B 5/06; B65B 5/00; B65B 5/10; B65B 5/106; B65B 59/00; B65G 57/32
USPC ......... 53/443, 446, 447, 448, 493, 504, 147, 53/152, 153, 531, 537, 540, 541, 543, 53/544, 473
See application file for complete search history.

(56) References Cited

U.S. PATENT DOCUMENTS

| | | | |
|---|---|---|---|
| 3,218,780 A | 11/1965 | Kerr | |
| 3,585,777 A * | 6/1971 | Pesch | B65B 53/063 53/157 |
| 4,779,715 A | 10/1988 | Pazdernik | |
| 4,939,891 A | 7/1990 | Podini | |
| 5,054,994 A | 10/1991 | Leeds et al. | |
| 5,092,448 A * | 3/1992 | Cinotti | B65G 57/32 198/418.4 |
| 5,454,212 A * | 10/1995 | Tanaka | 53/473 |
| 5,868,549 A * | 2/1999 | Lee et al. | 414/791.6 |
| 6,264,422 B1 | 7/2001 | Hennes et al. | |

(Continued)

FOREIGN PATENT DOCUMENTS

WO    WO 2006134622 A2 *   12/2006

*Primary Examiner* — Andrew M Tecco
*Assistant Examiner* — Chelsea Stinson
(74) *Attorney, Agent, or Firm* — Boyle Fredrickson, S.C.

(57) ABSTRACT

A system for stacking and packaging a plurality of discrete products of different sizes is provided. The system includes a stacking system having a movable lift plate, a slide plate assembly, an adjustable stop plate, and adjustable sidewalls. Layers of articles are introduced into a stack area, and movement of the lift plate and the slide plate assembly are coordinated to stack products in layers on the lift plate. The stacking system includes an adjustment assembly that allows adjustment of the position of the stop plate and/or the sidewalls relative to a frame such that the stacking system can be quickly and efficiently configured for use with layers of articles that have different depths and/or widths. In another aspect, the stacking system cooperates with a tipping system that rolls or tips stacked product to facilitate further processing or use of the product package.

6 Claims, 16 Drawing Sheets

(56) References Cited

U.S. PATENT DOCUMENTS

| | | | |
|---|---|---|---|
| 6,772,872 B2 | 8/2004 | Spangenberg et al. | |
| 6,974,299 B2 * | 12/2005 | Prakken | B65G 47/766 |
| | | | 198/426 |
| 7,306,087 B1 | 12/2007 | Hamsten | |
| 7,452,178 B2 * | 11/2008 | Dall'omo | B65B 25/146 |
| | | | 198/575 |
| 2010/0014953 A1 * | 1/2010 | Antoniazzi et al. | 414/789.5 |
| 2010/0287885 A1 * | 11/2010 | Paganini et al. | 53/447 |

* cited by examiner

ARTICLE STACKING AND PACKAGING SYSTEM

BACKGROUND OF THE INVENTION

1. Field of the Invention

The invention relates to an article stacking system or assembly and, more particularly, to a device for stacking, bundling or packaging products, and for discharging the product package from the stacking and packaging system wherein the stacking and packaging system that can be quickly and efficiently configured for use with different products or products of different sizes to accommodate different sized layers of product.

2. Discussion of the Related Art

Discrete product stacking and packaging systems, conventionally referred to as, e.g., automatic case packers, bundlers, or automatic stack and package systems, are rather commonplace in various packaging industries including, e.g., paper products and particularly paper roll products such as tissue paper and paper towel. The automatic stack packagers commonly include a feed assembly in which a plurality of discrete products are arranged in a layer and fed into a stacking system or stacker. The stacker frequently includes a movable lift plate whose position is adjusted during receipt of subsequent layers so that the discrete products of each layer are stacked in an aligned manner over and/or under a corresponding product in an adjacent layer. Once stacked, the product stack is discharged from the stacking system and delivered to a carton, bundler, or other product containment/packaging system to facilitate distribution, transport, and/or consumer consumption from the multiple product containment system. Commonly, particularly with respect to roll paper products, the packaging system includes a plastic containment system that wraps or bundles a layered arrangement of paper roll product in a layer of disposable and/or recyclable plastic material that is then secured onto itself to maintain the stacked orientation of the product for further handling, distribution, and/or consumption.

Typical automatic stack systems are configured for operation with a particular arrangement and number of layers of a given product. That is, the operability of such systems is largely dependent on the size and shape of each discrete product and the size and shape of reach discrete layer. Particularly with respect to paper roll products, such stacking systems commonly include various sidewalls and/or stop plates that maintain the orientation of the various discrete products and/or layers during the stacking operation. The various sidewalls and stop plates are commonly rigidly supported by a flame assembly to maintain the desired slidable interaction between the stacker and the discrete layers of product as the product and arrangement of product is advanced through the stacker between the feed assembly and the discharge and/or packaging assembly. Such systems are commonly ill-suited to handle any more than a minimum deviation in both the arrangement of multiple products and the size and shape of the discrete products.

In an effort to improve the useable range of operation of such stacking systems, manufacturers and/or third party users provide shim, spacer plates, and/or alternate sidewalls and stop plates that manipulate the orientation of the various sidewalls and stop plates relative to a stack area. Unfortunately, such systems require significant downtime to change out the sidewalls and stop plates and, thereby, detrimentally affect stacking and packaging operation efficiencies. Accordingly, such systems detrimentally affect the ability of the user to dynamically respond to operational needs that may be unrelated to the operational integrity of the stacker and packaging system.

Although others would be inclined to provide product stacking and packaging lines useable on an intermittent basis for stacking and packaging arrangements of discrete products, substantial capital costs as well as space requirements could limit the ability of the many manufactures to utilize such an approach to mitigate the shortcomings discussed above.

Accordingly, it would be desirable to provide an automated stacking and packaging device which can be quickly and conveniently configured for stacking and packaging layers of products that have different depths, widths, and/or heights. It would further be desirable to provide such an automated arrangement and packaging system which also positions stacks of various products for introduction into another machine. In addition, it would be desirable to provide an automated stacking and packaging system which reduces operator involvement during reconfiguration of discrete components of the stacking and packaging system during product change-over processes.

SUMMARY OF THE INVENTION

The present invention is directed to a system for aligning and stacking layers of products and packaging the multiple layers that resolves one or more of the drawbacks discussed above. One aspect of the invention discloses a stacking system having a lift plate that is movable vertically through a stack area, a slide plate assembly movable horizontally into and out of the stack area, a stop plate bordering a rear edge of the stack area, and first and second sidewalls bordering side edges of the stack area. Discrete products are introduced into the stack area in coordination with vertical movement of the lift plate and horizontal movement of the slide plate assembly to stack the products in layers on the lift plate. The stacking system includes an adjustment assembly that allows the position of the stop plate and/or the sidewalls to be adjusted relative to the lift plate to adjust the size of and/or shape of the stack area, permitting the stacking system to be quickly and efficiently configured for use with layers of articles that have different depths and/or widths.

In another aspect, the stacking system may cooperate with a tipping system or turn system that turns stacked layers of products 90 degrees before the stacked products are delivered to a downstream machine such as a case packer or a bundler.

Another aspect of the invention discloses a method that includes arranging one or more of a vertically movable lift plate, a horizontally movable slide plate assembly, first and second sidewalls, and a stop plate relative to a frame assembly to define a stack area through which a lift plate and a slide plate assembly move. The method additionally comprises conveying products into the stack area and coordinating movement of the lift plate and the slide plate assembly to stack products in layers on the lift plate, which each layer having a first size and shape. The method further includes horizontally moving at least one of the first sidewall, the second sidewall, and the stop plate relative to the frame assembly to alter the size and/or shape of the stack area and thus to accommodate stacking of products in layers having a second size and/or shape.

Another aspect of the invention that is usable with one of more of the systems, assemblies of methods disclosed above includes a tipping system or turning system that rolls or tips the stacked layers of products before or after the stack is delivered to a downstream machine such as a bundler or a case packer.

Other features and advantages of the present invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference characters represent like parts throughout.

DETAILED DESCRIPTION OF THE PREFERRED EMBODIMENTS

Figure 1:
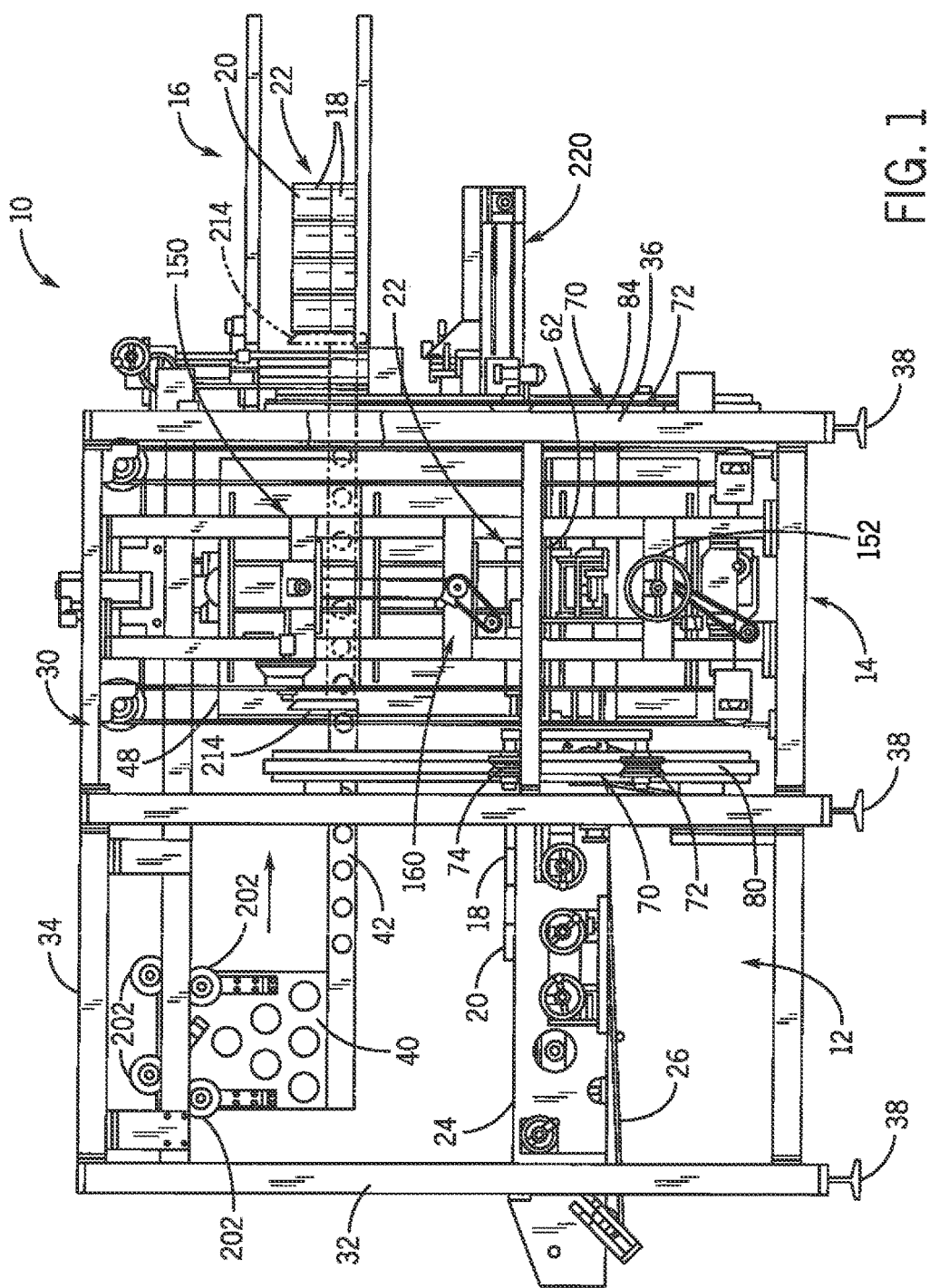
FIG. 1 is a side elevation view of a packaging system according to an embodiment of the present invention and having a feed assembly and a stacking system.

A preferred exemplary embodiment of a roll paper product feed, stack, and packaging systems according to the present invention are illustrated in the accompanying drawings in which like reference numerals represent like parts throughout.

Figure 2:
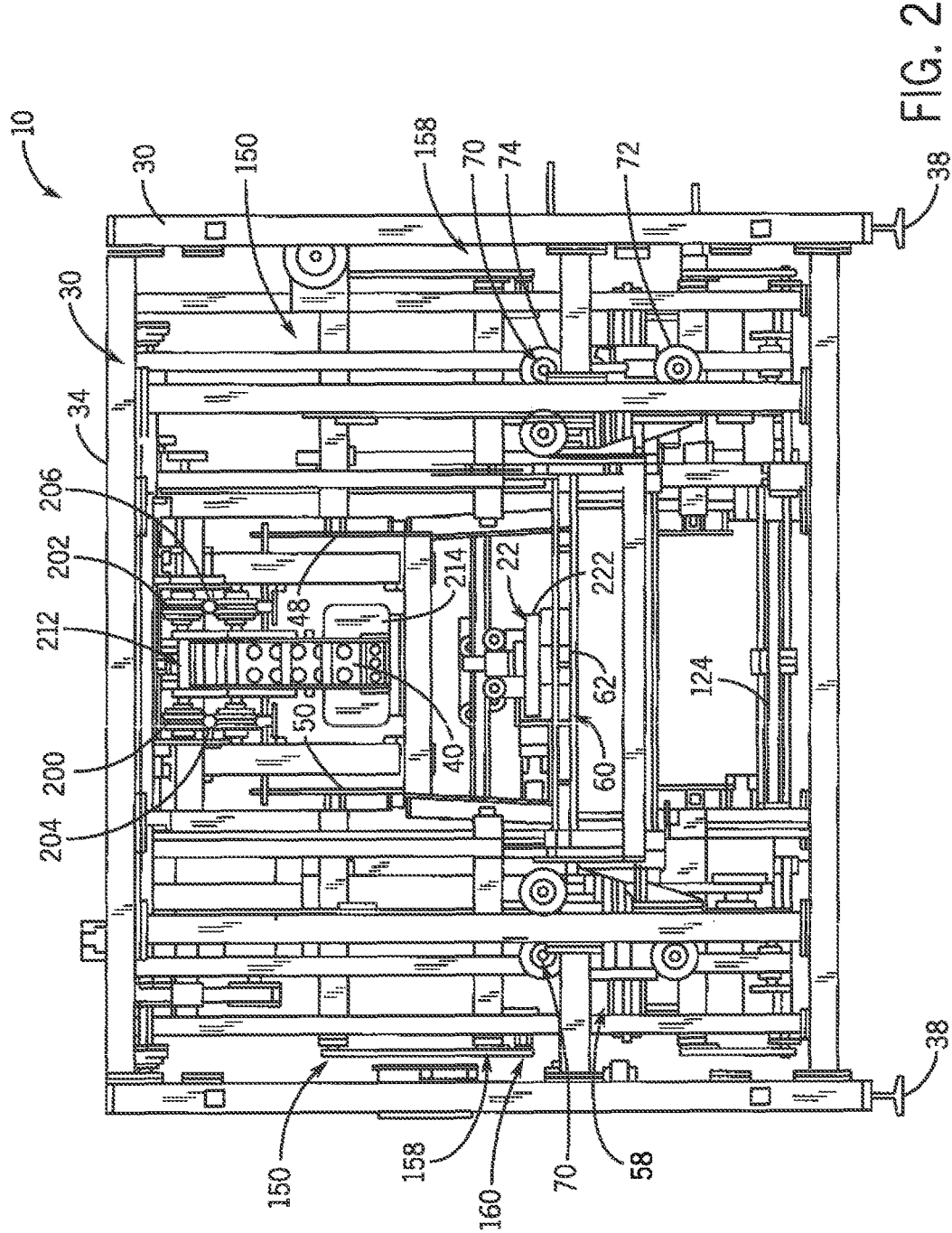
FIG. 2 is a front elevation view of the packaging system of FIG. 1.
Figure 3:
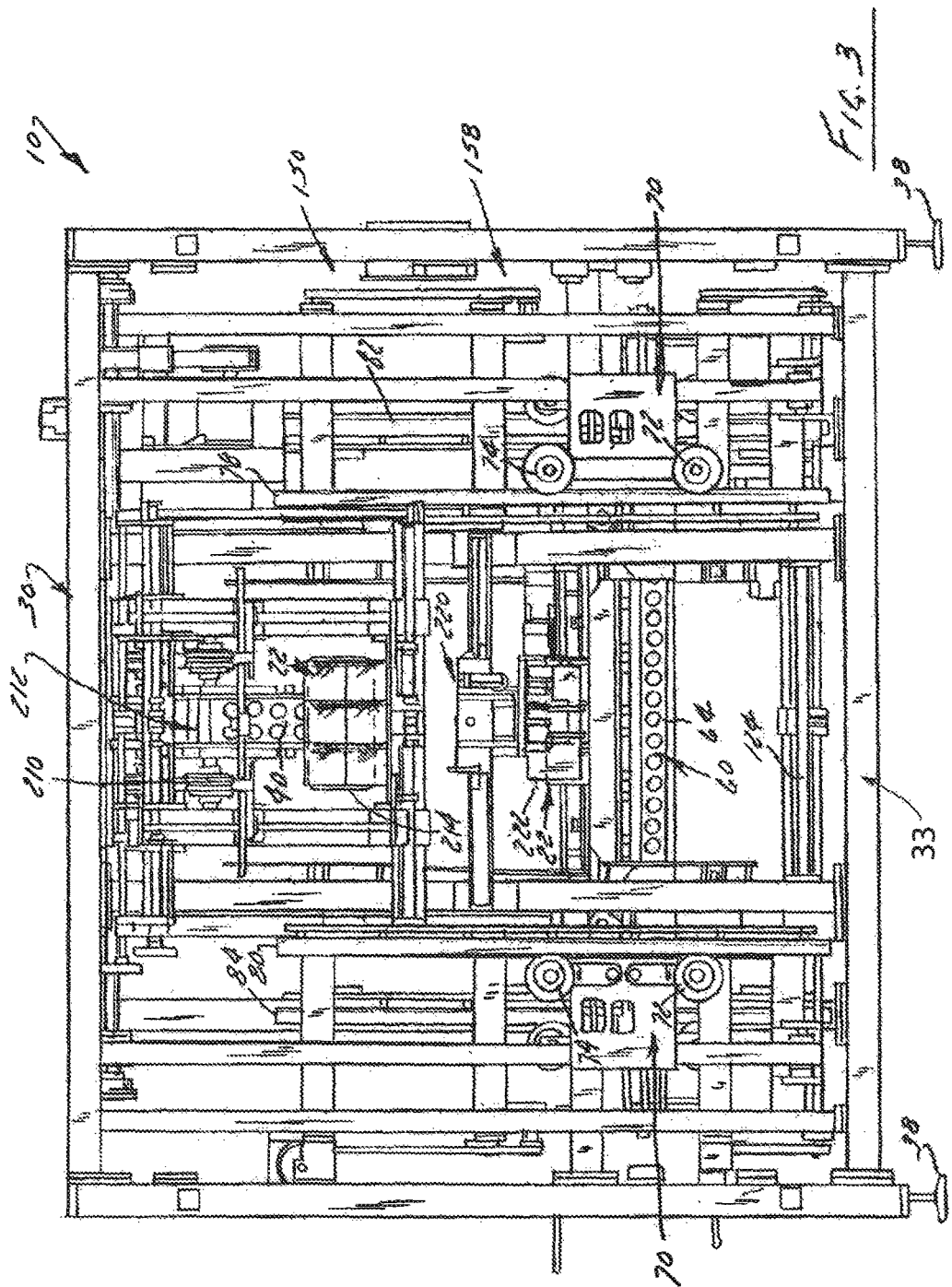
FIG. 3 is a rear elevation view of the packaging system shown in FIG. 1.

FIGS. 1-3 show a product packaging system 10 according to the preferred embodiment of the present invention. Packaging system 10 is configured to receive and arrange a number of discrete articles of products into respective layers, stack the respective products in layers, and discharge the stacked products into a downstream machine such as a bundler or a case packer. Packaging system may also tip or turn the stacked layers of products prior to discharging them from the system 10. Packaging system 10 includes a feed system 12 and a stacking or stack assembly or system 14 that stacks layers of products and that feeds the stacked products to a downstream system such as a bundler or a case packer. A tipper or tipping system 16 may be located between the stack system and the bundler or case packer to properly orient the stack for packaging while retaining its stability. Packaging system can be configured and/or operated to obtain a desired stacked product orientation for subsequent bundling and/or package size and orientation for desired discharge of the product package from system 10. Toward this end, feed system 12, stack system 14, and tipping system 16 are oriented to form layers 18 of discrete products 20, stack the layers 18 to form a stack or multilayered product 22, tip the stack 22 over while preserving its integrity, and convey the tipped stack to a downstream device. As disclosed further below, the present invention provides a packaging system that can be quickly and conveniently configured to stack layers products that have different spatial requirements that may depend on one or more of the number of products in a given row or column, the number of product layers, and/or the size of the discrete or individual products.

Feed system 12 includes a carriage 24 that supports an elongate carrier or belt 26 configured to arrange and communicate product layers 18 to stacking system 14. Feed system 12, stack system 14, and tipping system 16 are interconnected by a frame assembly 30 that includes various elongate members 32, 33, 34, 36 (FIG. 3) that connect and support the various components of feed system 12, stacking system 14, and tipping system 16 to facilitate the progression of product 20 through packaging system 10. It is appreciated that frame assembly 30 can be provided as either a single unitary frame structure and/or a plurality of interconnected elongate frame members and/or that each of feed, stacking, and tipping systems 12, 14, 16 include frame assemblies constructed to cooperate with one another so as to align the respective areas associated with passing product through packaging system 10. Frame assembly 30 includes one or more adjustable supports 38 whose position relative to frame assembly 30 can be manipulated so as to maintain a desired alignment and/or support between feed system 12, stacking system 14, and tipping system 16 for a desired progression of product 20 through packaging system 10.

Packaging system 10 includes a discharge assembly 40 having an elongate arm 42 that is movable relative to frame assembly 30 to translate multilayered product or stack 22 from stacking system 14 to tipping system 16. As explained further below, it is further envisioned that discharge assembly 40 translate multilayered product completely through tipping system 16 to further downstream machinery such as a case packer (not shown).

Figure 4:
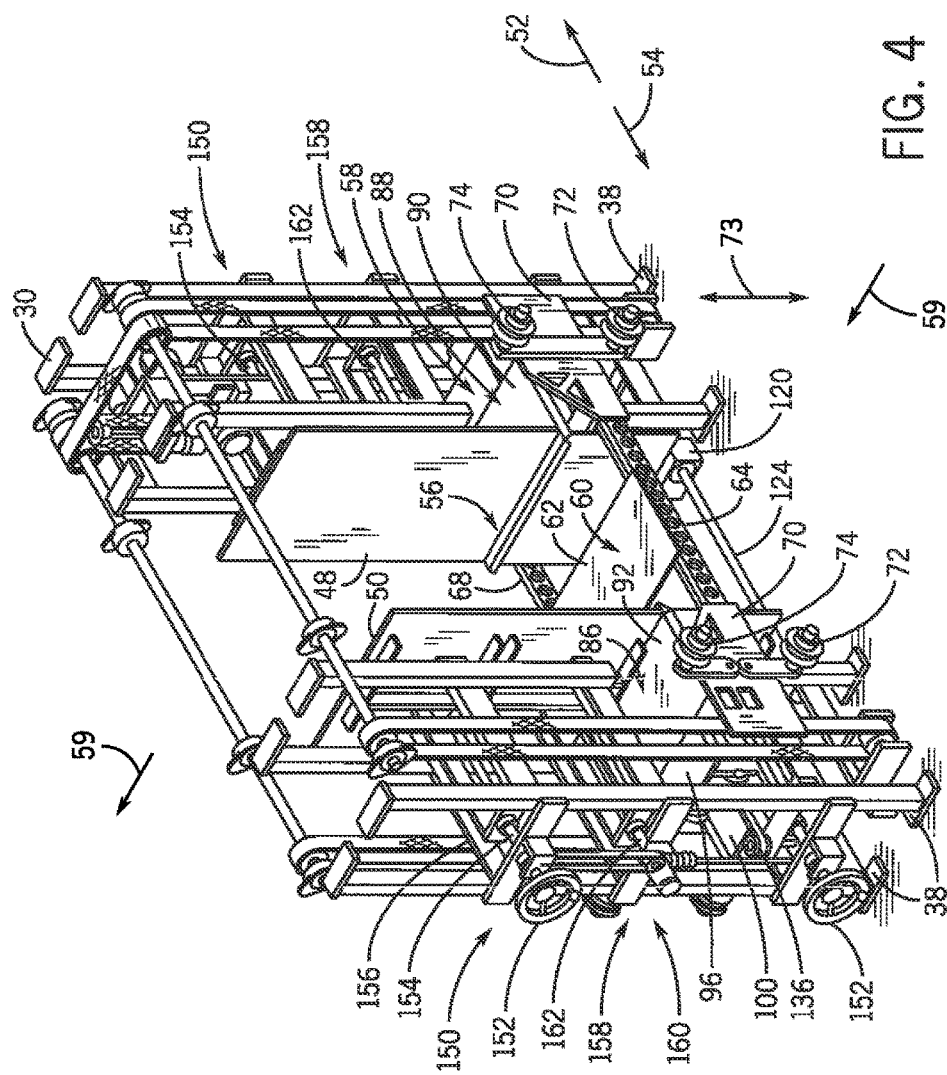
FIG. 4 is a perspective view of the stacking system shown in FIG. 1.

FIG. 4 shows stacking system 14, aside from a stop plate assembly as discussed further below, removed from packaging system 10. As shown in FIG. 4, stacking system 14 includes a first side plate or sidewall 48 and a second side plate sidewall 50 that are positioned on opposite lateral sides of a stack area or stacking area 56. With respect to the view shown in FIG. 4, it should be appreciated that product advances and is ejected from stacking area 56 along the direction indicated by arrows 59 such that sidewalls 48, 50 are oriented in a crossing, transverse, or perpendicular orientation relative to the progression of product through packaging system 10. The rear edge of the stack area 56 is bounded by a horizontally movable stop plate 214. Products are stacked in the stack area through coordinated horizontal movement of a slide plate assembly 58 and vertical movement of a lift plate assembly.

Figure 7:
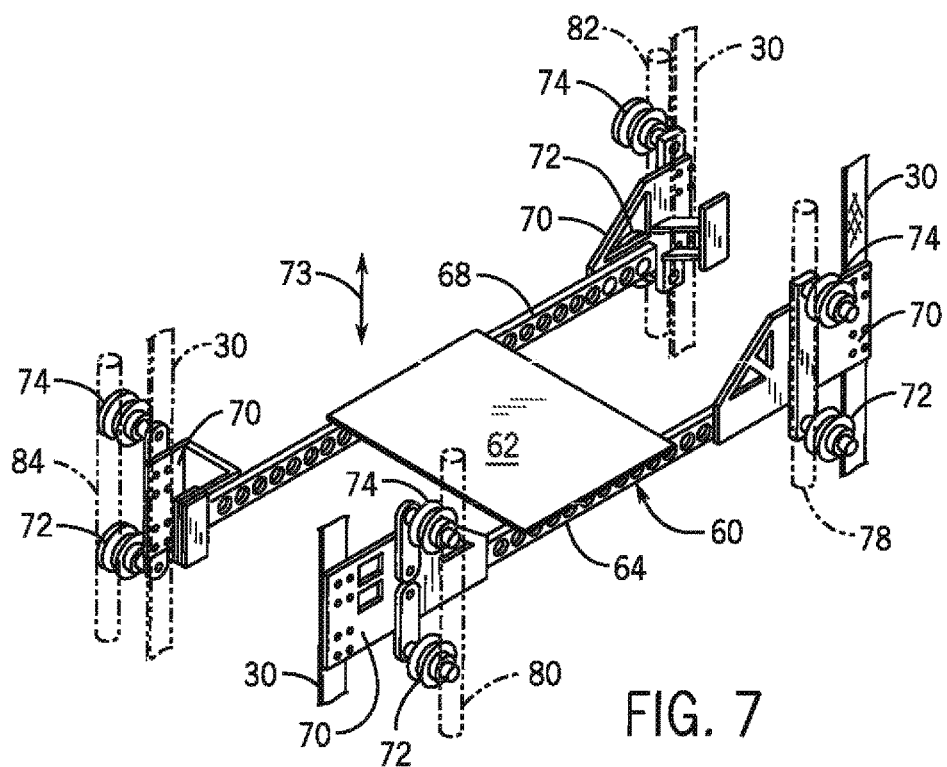
FIG. 7 is a perspective view of a vertical lift plate assembly of the stacking system shown in FIG. 4.

Referring to FIGS. 4 and 7, lift plate assembly 60 includes a lift plate 62 supported by a pair of rails 64, 68 that extend along lateral directions 52, 54 relative to the direction associated with the feed and ejection of product from stacking system 14. A trolley 70 is disposed at each of the opposite longitudinal ends of lift plate assembly 60. Each trolley 70 cooperates with a vertically oriented elongate bar or guide rail 78, 80, 82, 84 (FIG. 7) to facilitate the vertical movement of lift plate 60 through the stack area 56. This vertical movement is indicated by arrow 73. As shown in FIG. 7, each trolley 70 includes a first roller 72 and a second roller 74 that each cooperate with respective elongate guide rails 78, 80, 82, 84 to facilitate the vertical movement 73 of lift plate 62 while maintaining the horizontal orientation of lift plate 62 relative to frame assembly 30. Still referring to FIG. 7, it should be noted that guide rails 78, 80 are positioned laterally inboard relative to the rollers 72, 74, whereas guide rails 82, 84 are oriented laterally outboard relative to the adjacent roller 72, 74. This configuration mitigates twisting and/or racking of lift plate assembly 60 relative to frame assembly 30 during vertical translation of the lift plate assembly 60.

Figure 5:
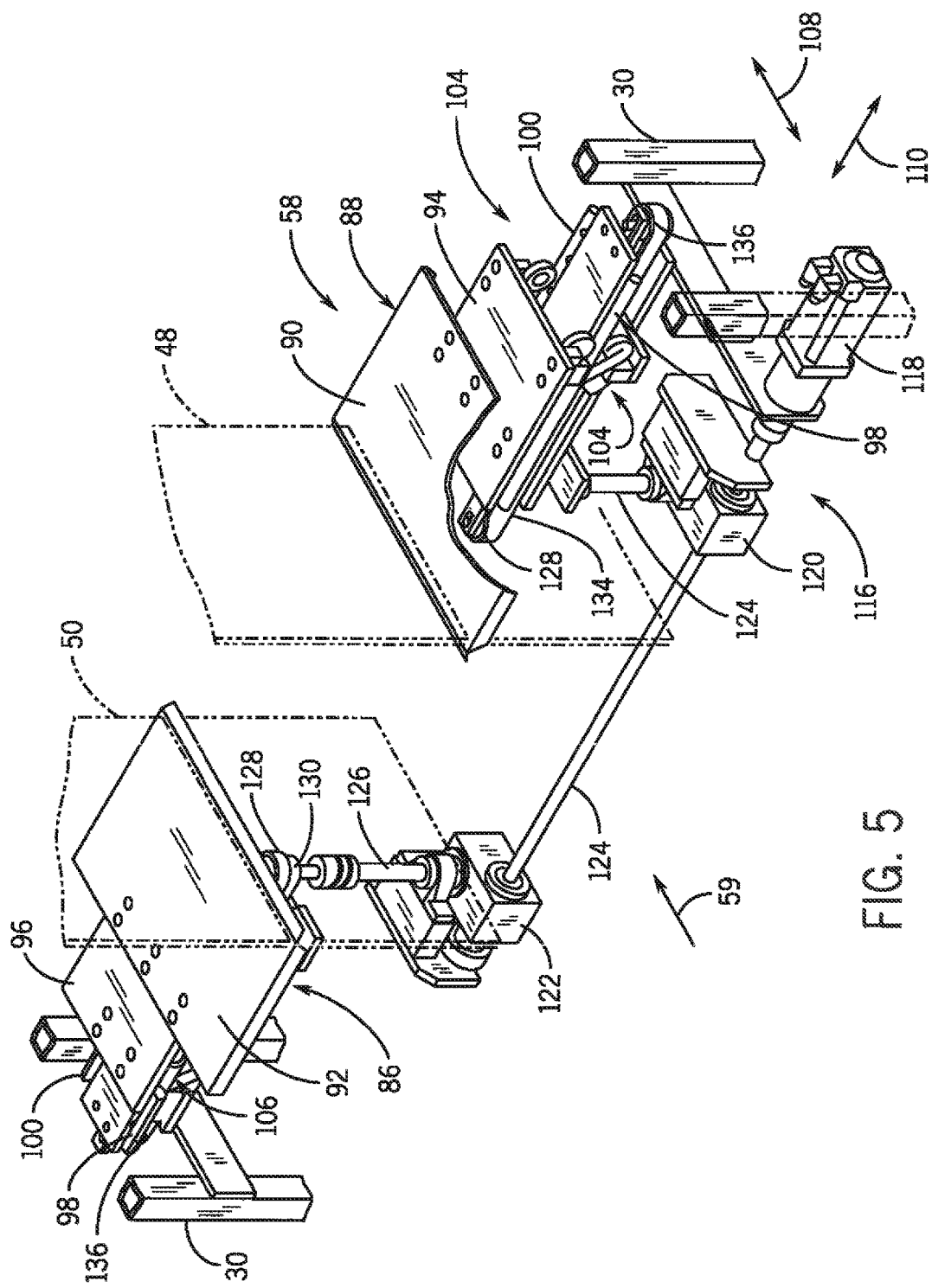
FIG. 5 is a perspective view of a horizontal slide plate assembly of the stacking system shown in FIG. 4.

Referring to FIGS. 4, 5, 25, and 26, slide plate assembly 58 is configured to selectively support a layer of articles in the stack area 56 and then deposit that layer on an underlying area that is supported on the lift plate 60. Slide plate assembly includes a first horizontal plate assembly 86 and a second horizontal plate assembly 88. Each plate assembly 86, 88 includes a respective plate 90, 92 that is horizontally movable in lateral directions 52, 54 relative to stacking area 56 and sidewalls 48, 50 under power of a drive system 116, described below. As shown in FIG. 5, each horizontal plate 90, 92 is supported by a trolley plate 94, 96 that movably cooperates with a respective rail 98, 100. Each trolley plate 94, 96 includes one, and preferably two, roller assemblies 104, 106 that movably cooperate with a respective rail 98. Preferably, rails 98 and roller assemblies 104 are oriented at opposite lateral sides, indicated by arrow 108 (FIG. 5), relative to a direction of travel, indicated by arrow 110, of each horizontal plate 90, 92. This construction ensures stable horizontal movement of the horizontal plates 90, 92 relative to frame assembly 30 throughout the range of movement of the respective plate assemblies 86, 88 and attributable to movement of the respective trolley plate or trolley assembly 94, 96.

Figure 25:
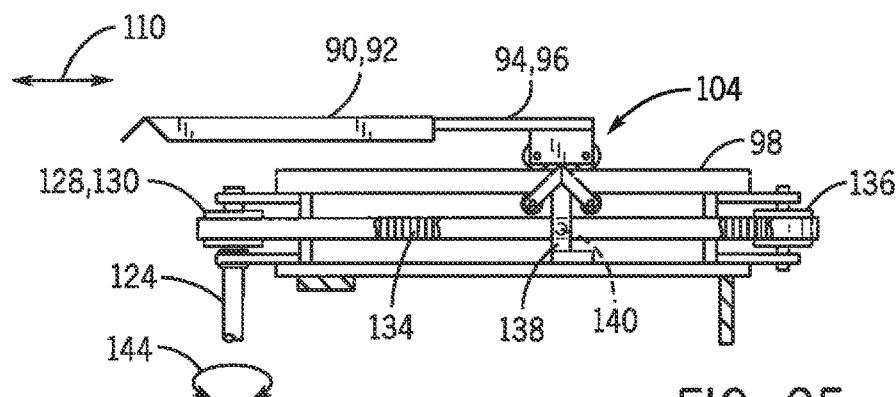
FIGS. 25 and 26 are side elevation views of one side of the horizontal slide plate assembly shown in FIG. 5.
Figure 26:
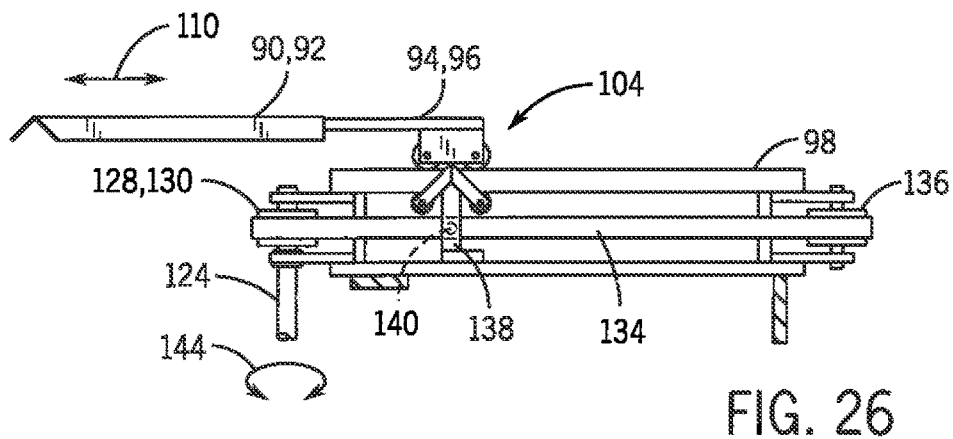

Drive system 116 includes a motor 118 that is coupled to a first gearbox 120 and a second gearbox 122 via a connecting rod 124. Connecting rod 124 traverses stacking area 56 and is disposed generally beneath lift plate 62. Each gearbox 120, 122 includes to drive shaft 124, 126 that is connected to a rotatable drive member 128, 130 (FIGS. 25, 26). A flexible drive member 134, such as chain or belt, is engaged with one of respective rotatable drive members 128, 130 and extends along direction 110 to a rotatable support member 136 such that the elongated drive member extends longitudinally beneath the respective horizontal plate assembly 86.

One of roller assemblies 104 of each trolley assembly 94, 96 includes a bracket 138 that is secured via a fastener 140 or the like to the flexible drive member 134 associated with the respective trolley assembly 94, 96. Operation of the motor 118 effectuates clockwise and counterclockwise rotation, indicated by arrow 144, of drive shaft 124 and thereby longitudinal translation of the corresponding trolley plate 94, 96 into and out of the stack area 56. As explained further below with respect to FIGS. 12-16, such operation allows the sequential staging of rows and columns products into stacking area 56 and the depositing of the resulting layer on the underlying stack without adversely affecting the orientation of any of the discrete products 20 associated with adjacent layers which may have previously been positioned stacked on the lift plate 62. It should further be readily appreciated that horizontal plates 90, 92 move in generally opposite directions relative to one another during the sequential operation of stacking system 14, move in a crossing direction relative to stack area 56, or move in a crossing direction relative to the direction of introduction of product into stack area 56.

Figure 24:
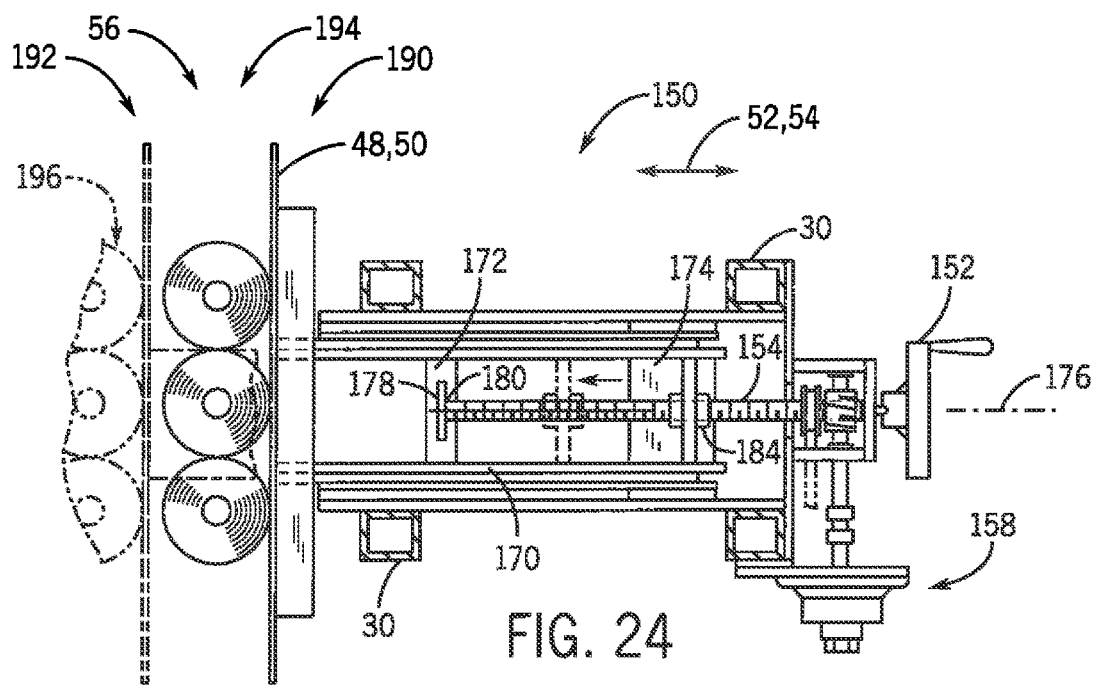
FIG. 24 is a top plan view of a sidewall adjustment assembly of the stacking system shown in FIG. 4.

Referring to FIGS. 4 and 24, each sidewall 48, 50 is attached to frame assembly 30 by an adjustment mechanism 150 so as to permit the width of the stack area to be adjusted. Each adjustment mechanism 150 includes a handle or crank 152 that is connected to a screw 154 associated with an upper adjustment assembly 156 that extends along lateral directions 52, 54. Each adjustment mechanism 150 further includes a transmission system 158 that communicates a driving force from crank 152 to a lower adjustment assembly 160. As explained further below with respect to FIG. 24, rotational operation of screw 154 and another screw 162 associated with the respective adjustment mechanism translates the corresponding sidewall 48, 50 in lateral directions 52, 54 during operation of the respective crank 152, thereby manipulating the width associated with stack area 56 and thereby the width associated with a product layer being stacked.

As shown in FIG. 24, respective sidewalls 48, 50 include a support plate 170 that extends in a respective lateral direction 52, 54 away from stacking area 56. Each support plate 170 slidably cooperates with a frame web wall 172 that extends in a crossing direction relative to the longitudinal axis, indicated by line 176, of the respective screw 154, 162. Frame web wall 172 is positionally fixed with respect to frame 30, and includes a support 178 that cooperates with an end 180 of the respective screw 154 but does not interfere with rotation of screw 154, 162 due to operation of the respective crank 152 or the translation of the respective support plate 170 relative to frame assembly 30. A support plate web wall 174 also extends in a crossing direction relative to longitudinal axis 176 of the respective screw 154, 162 but is secured to the respective support plate 170 so as to be movable therewith relative to the respective frame web wall 172 along the longitudinal length of the respective screw 154, 162 during operation of the corresponding screw.

As shown in FIG. 24, this arrangement permits each sidewall 48, 50 to move between a variety of positions along the longitudinal length of the respective screw 154, 162. Hence, each sidewall 48, 50 can achieve a first position 190 and a second position 192 to adjust the width the stack area 56 to accommodate a first product layer shape 194 and a second product layer shape 196. The adjustable sideplates 48 and 50 thus allow use of stacking system with product configurations having a plethora of distinct widths.

Figure 8:
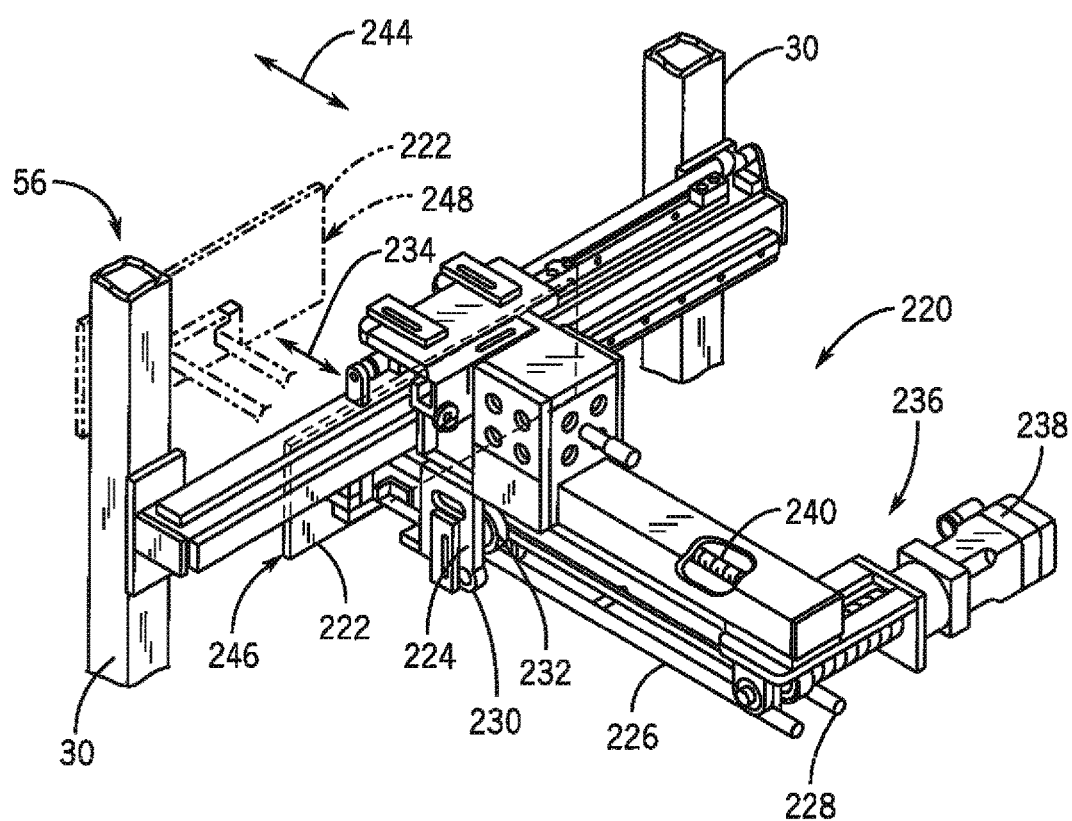
FIG. 8 is a perspective view of an adjustable stop plate assembly of the stacking system shown in FIG. 4.
Figure 9:
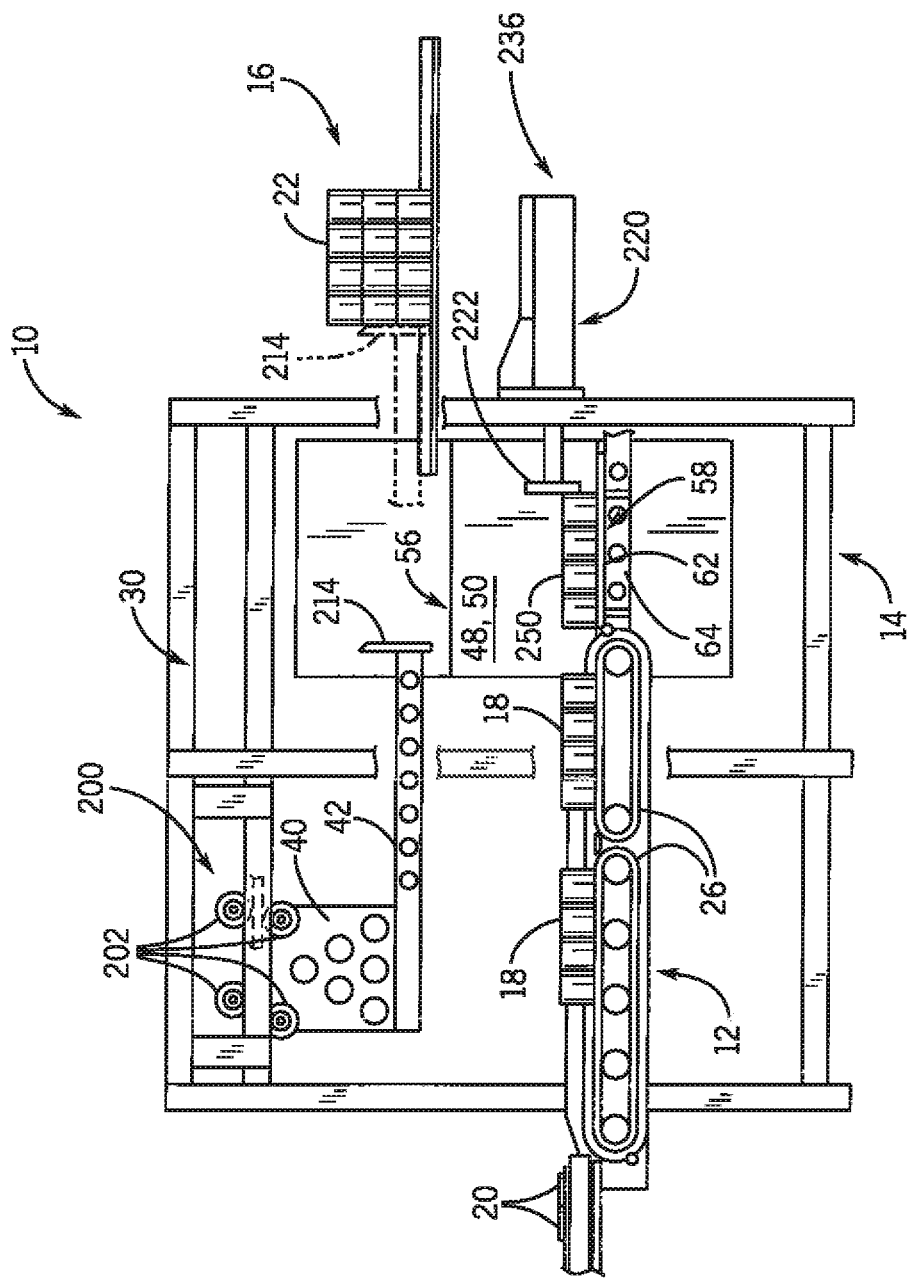
FIGS. 9-11 are partial side elevation views of the packaging system shown in FIG. 1, showing the advancement of product through the packaging system.

Referring to FIGS. 1 and 8, stop plate 222 is part of a stop plate assembly 220 that is movably positionable relative to frame assembly 30 and thereby stack area 56. As shown in FIG. 8, stop plate assembly 220 includes a carriage 224 that is movable along a pair of elongate rails 226, 228 that extend in the product travel direction 58 relative to packaging system 10. This movement permits the depth of the stack area 56 to be adjusted to accommodate stacks of different depths.

Carriage 224 includes a number of rollers 230, 232 that cooperate with respective rails 226, 228 to effectuate the longitudinal translation, indicated by arrow 234, of stop plate 222 relative to stack area 56. The carriage 224 is driven by a drive system 236 that is powered by a motor 238. Alternatively, it is envisioned that one or all of sidewalls 48, 50 and stop plate 222 could be adjustably positionable relative to frame assembly 30 either automatically, via use of motors, pneumatic, hydraulic, or linear actuators, or manually adjustable such as via the use of crank wheels or other manual adjustment systems.

Still referring to FIG. 8, motor 238 is connected to a drive screw 240 that is operationally connected to carriage 224 in a manner similar to that described above with respect to the adjustment of sidewalls 48, 50 relative to frame 30. That is, rotation of drive screw 240 via operation of motor 238 effectuates translation of stop plate 222 in directions 234 relative to frame assembly 30 and stacking area 56 so as to thereby manipulate a depth, indicated by arrow 244, of stack area 56. Although infinitely positionable along drive screw 240, stop plate 222 can attain at least a first position 246 and a second position 248 relative to stacked area 56 and frame assembly 30 to accommodate product shapes and configurations having different respective depths.

Figure 6:
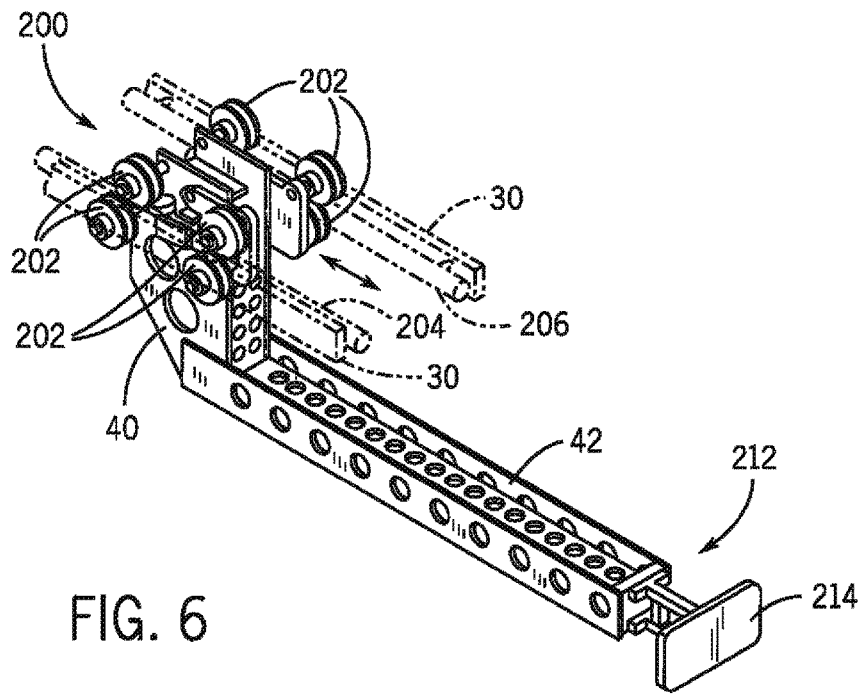
FIG. 6 is a perspective view of a stack discharge assembly of the stacking system shown in FIG. 4.

Referring to FIGS. 1, 3, and 6, discharge assembly 40 includes a carriage 200 and a number of rollers 202 that are supported at opposite lateral sides thereof. Rollers 202 cooperate with alternate rails 204, 206 that are attached to frame assembly 30. As shown in FIG. 3, discharge assembly 40 includes a drive system 210 that is connected to carriage 200 and configured to selectively extend and retract arm 42 relative to stacking system 14 and tipping system 16. A push pad or plate 214 is disposed at an end 212 of arm 42 and is shaped to push a stacked but non-bundled product configuration 22 from stacking system 14 and toward tipping system 16.

Operation of the stacking system now will be described with reference to FIGS. 9-16. After the adjustment assembly 160 and carriage 224 are operated to position the sidewall plates 48 and 50 and the stop plate 222 at locations defining a stack area 56 of a desired width and depth, a number of discrete products 20 are advanced into the stack area 56 to form a product layer 250. The individual products typically will be arranged in a configuration of rows and columns of, for examples, 3 rows of products having three columns in each row. Understandably, other numbers of products per row, per column, or per layer, and other numbers of layers are attainable as may be desired. A layer may be formed, for example, by staging the desired configuration upstream of the stack area, positioning the lift plate 62 in the stack area 56, and pushing the layer 250 into the stack area 56 via operation of the feed system 12 such that the rear row of articles is positioned against or just in front of the stop plate 222. Preferably, stop plate 222 and sidewalls 48, 50 are positioned so as to contact but not interfere with biased or gravitational translation of product layers relative to stack area 56

After a first product layer 250 has been disposed on lift plate 62, lift plate 62 travels in a downward direction, indicated by arrow 252, such that the upper surface of the first layer is located just beneath the plane of the stack area 56, whereupon the horizontal plates 90, 92 of the slide plate assembly 58 can be introduced into stacking area 56 without contacting first layer 250. Alternatively, it is envisioned that lift plate 62 may be maintained in very close proximity to horizontal plates 90, 92 such that an initial product layer can be introduced to stack area 56, initially supported by horizontal plates 90, 92, and then, upon retraction of horizontal plates 90, 92 from stack area 56, introduced into supported engagement with lift plate 62. Such an operation can be conveniently effectuated by the use of various limits and/or operational stops associated with the movement of the respective assemblies as is well understood in the art.

Figure 10:
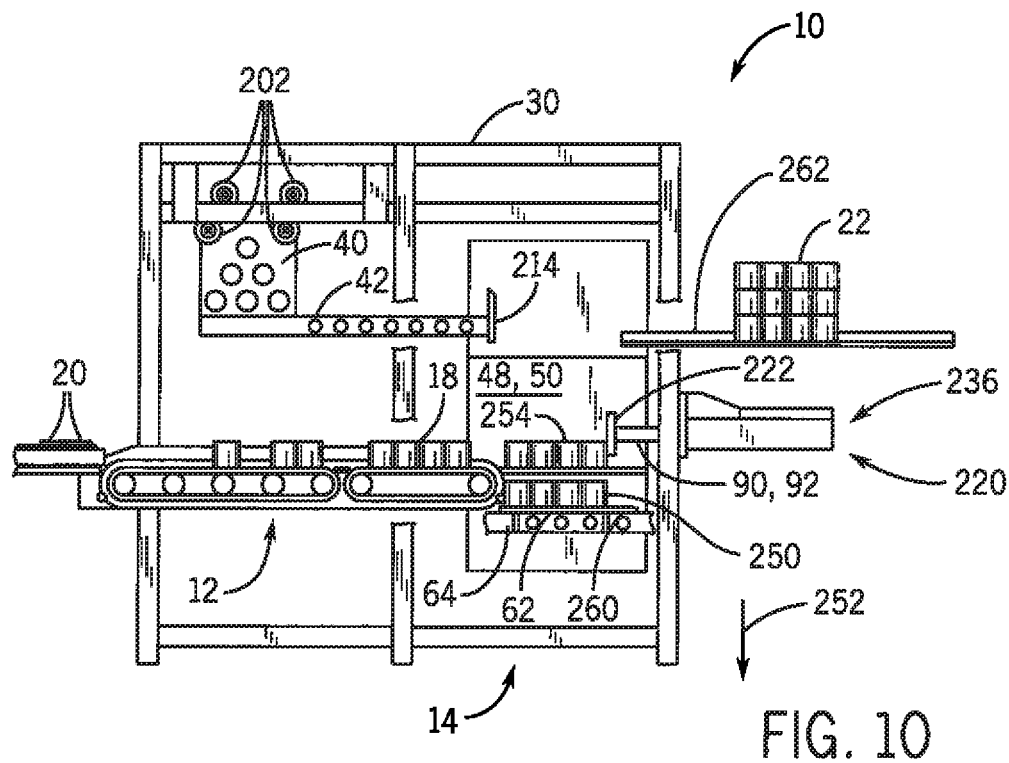
Figure 11:
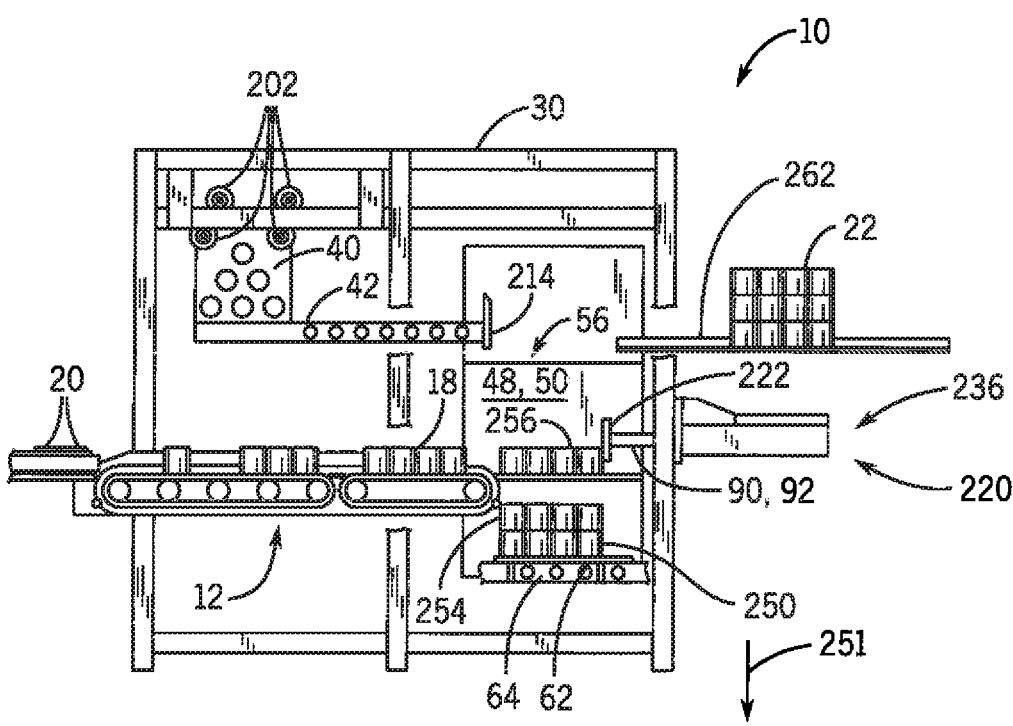
Figure 12:
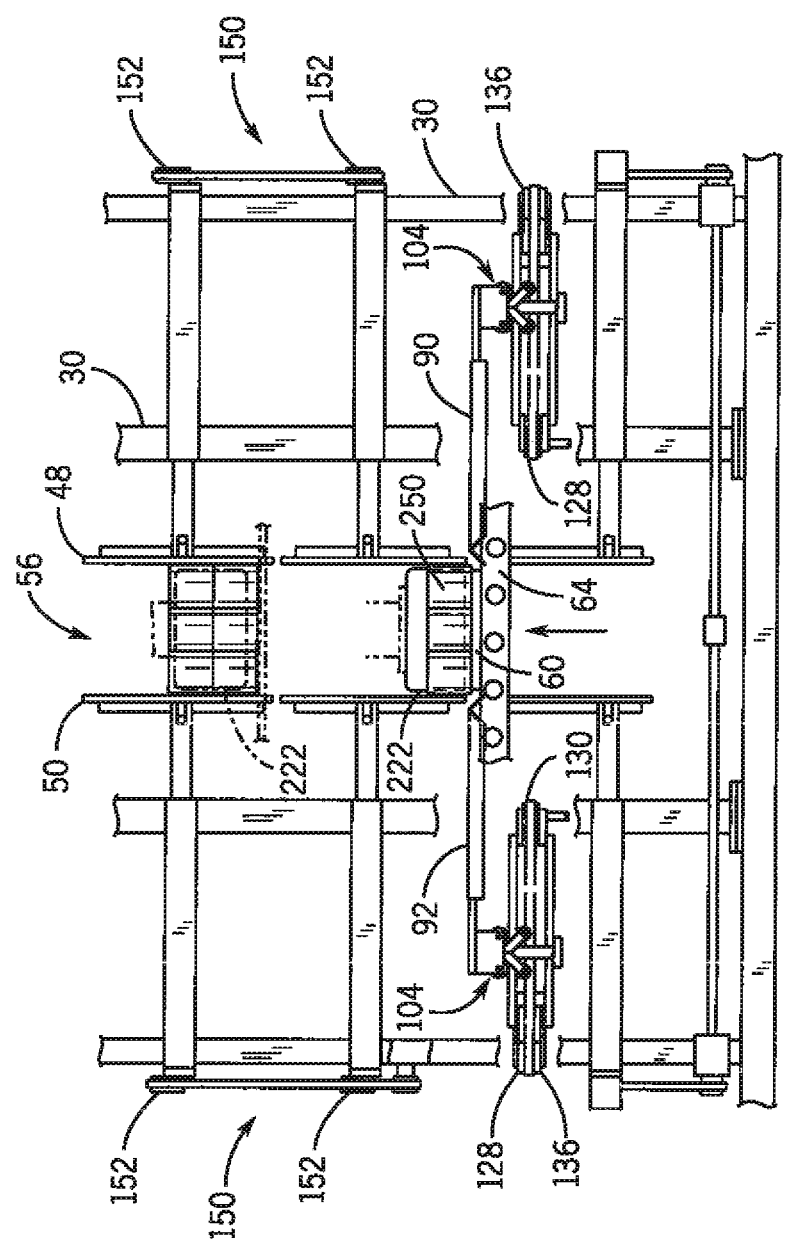
FIGS. 12-16 are partial front elevation views of the stacking system shown in FIG. 1, showing the sequential vertical operation of the stacking system.
Figure 13:
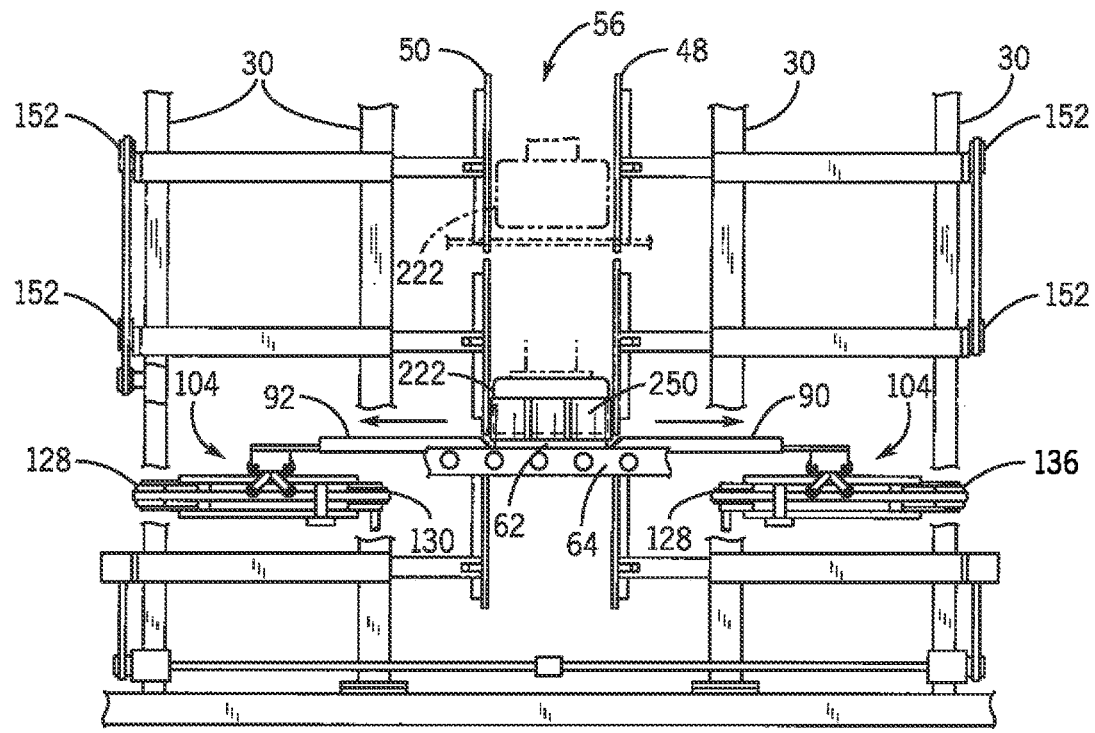
Figure 14:
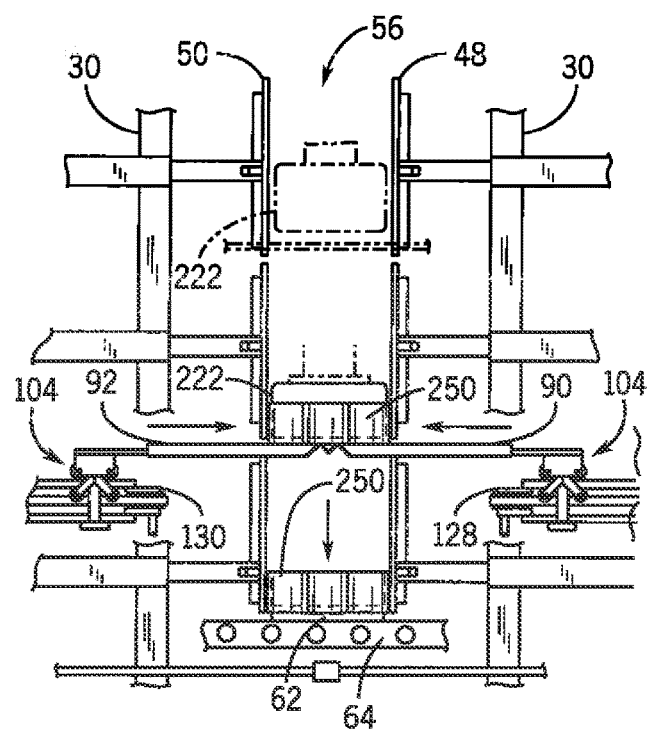
Figure 15:
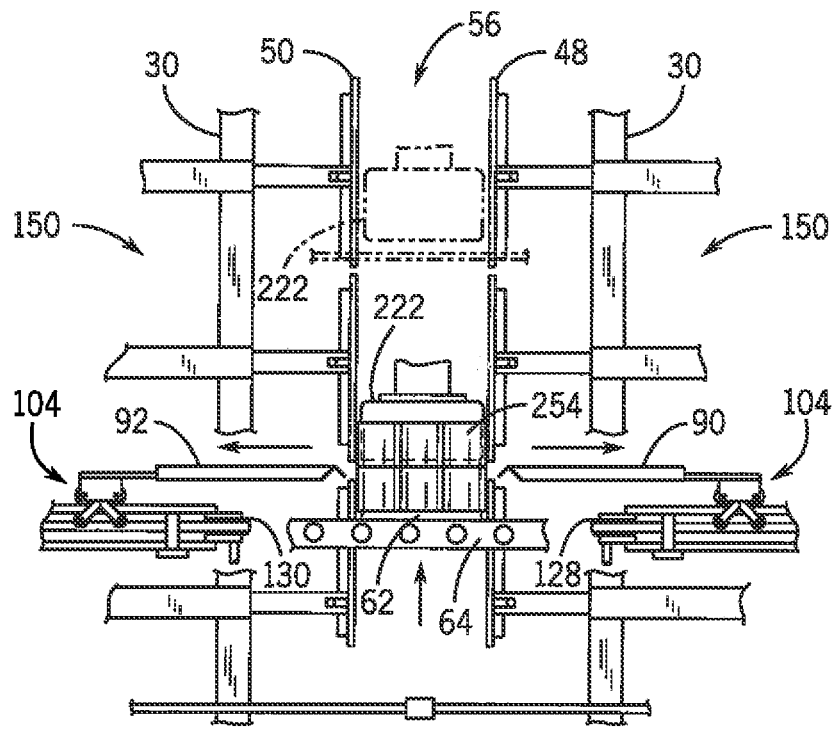
Figure 16:
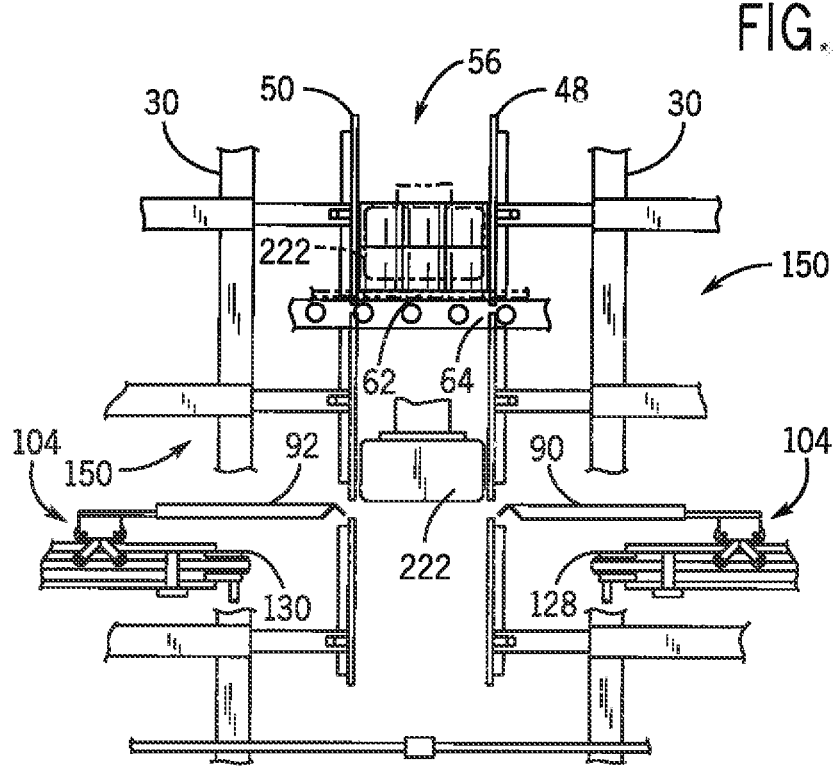
Figure 17:
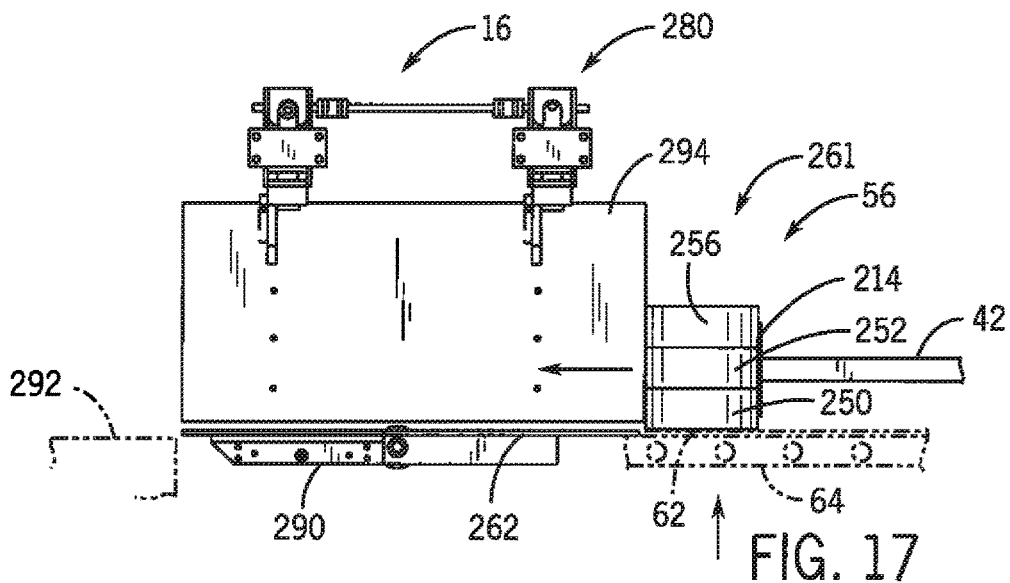
FIG. 17 is a partial side elevation view of the packaging system shown in FIG. 1 and shows a product stack being discharged from the stacking system to a tipping assembly that tips or turns the stack 90 degrees.
Figure 18:
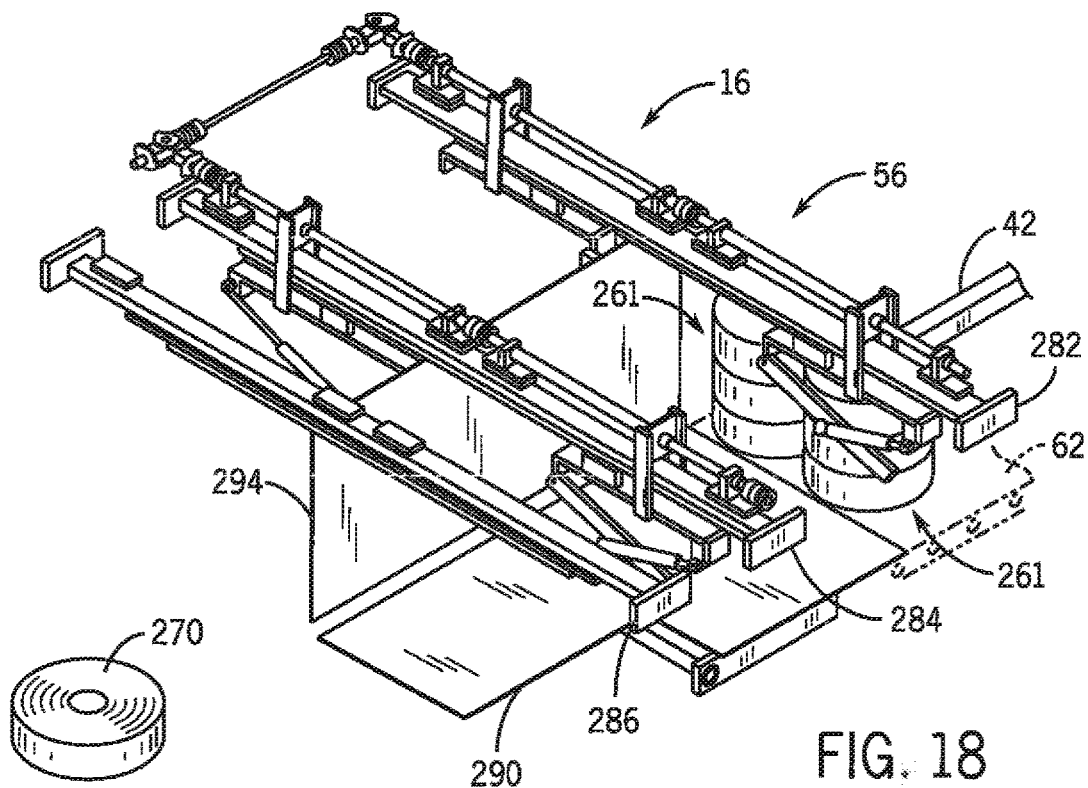
FIG. 18 is a perspective view of the tipping assembly shown in FIG. 17.
Figure 19:
FIG. 19 is a perspective view of an exemplary roll paper product that can be stacked and packaged with the packaging system shown in FIG. 1.
Figure 20:
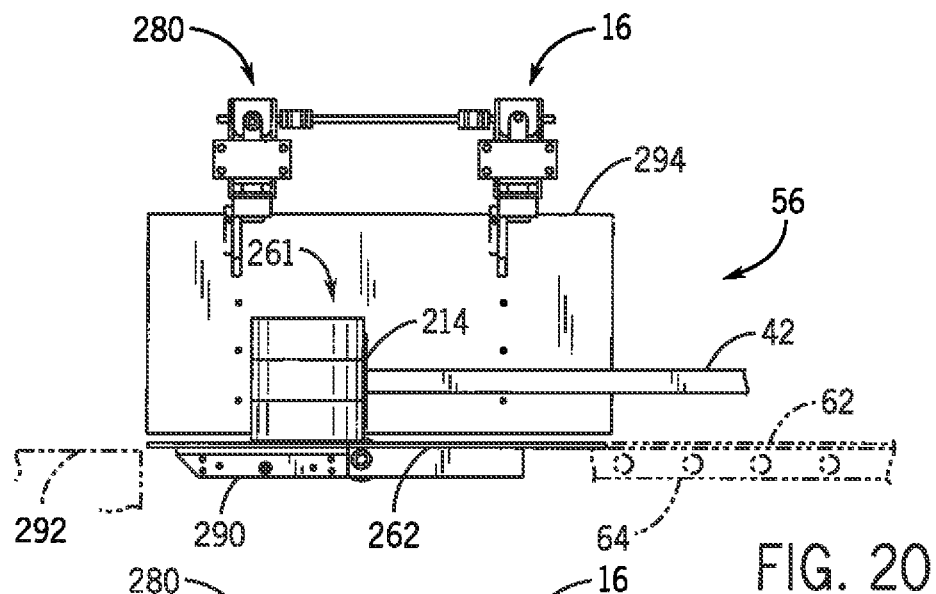
FIGS. 20-22 are a partial lateral side elevation of the tipping assembly of FIGS. 17 and 18 and collectively show the sequential operation of the tipping assembly.
Figure 21:
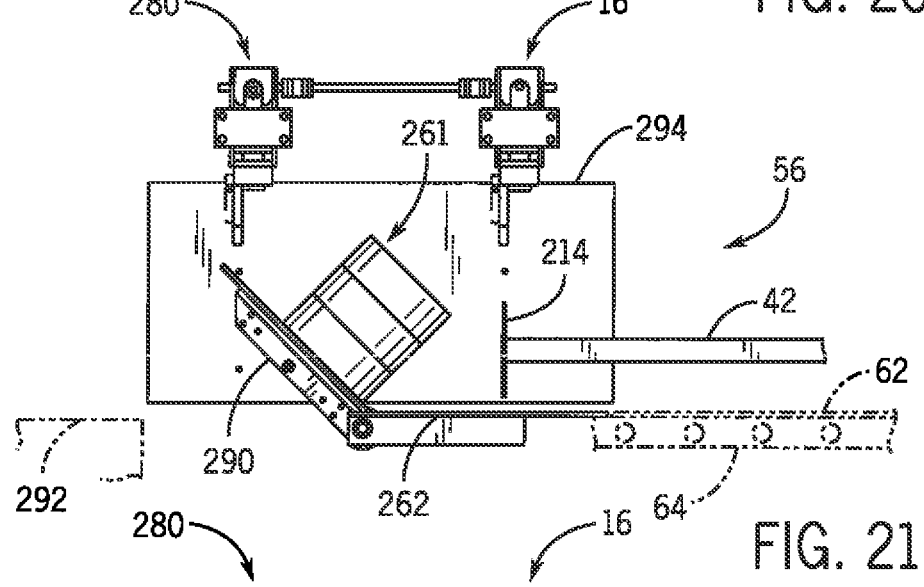
Figure 22:
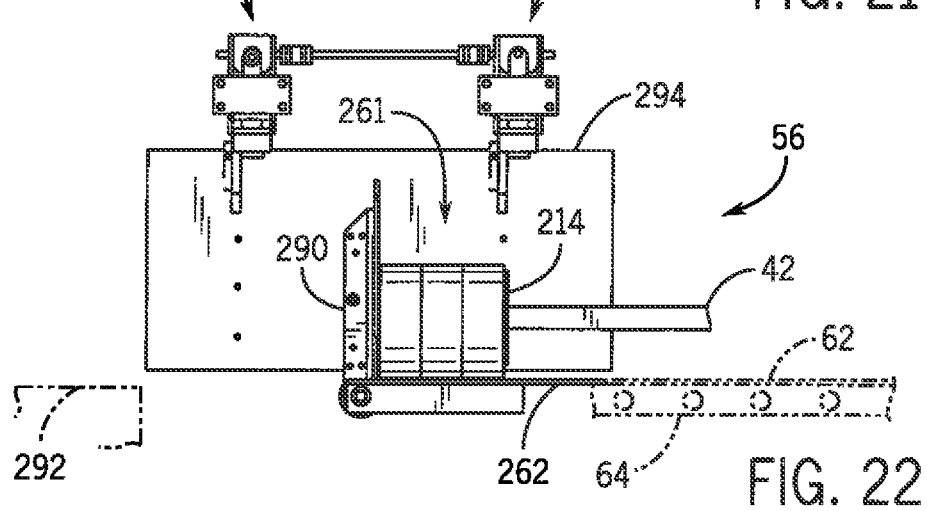
Figure 23:
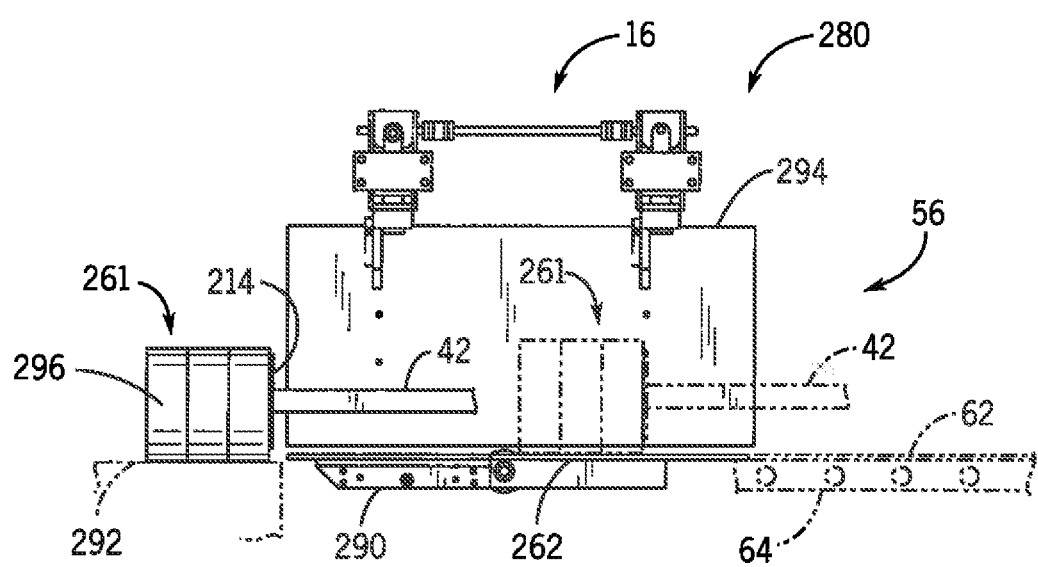
FIG. 23 is a view similar to FIG. 20 and shows the discharge of a turned multiple product package from the packaging system shown in FIG. 1.

As shown in FIG. 10, a second product layer 254 is introduced by feed system 12 to stack area 56 so as to generally overlie first product layer 250 while being supported by horizontal plates 90, 92. As shown in FIG. 15, subsequent retraction of horizontal plates 90, 92 stacks the second product layer 254 upon first product layer 250 with no intervening structure of packaging system 10. The lift plate assembly 60 can then be indexed down to position the second product layer beneath the plane of the stack area 56, and the process can repeated until a desired number of layers of products are stacked one upon the other and supported on the lift plate 62.

Once the desired number of product layers has been vertically stacked on the lift plate 52, lift plate assembly 60 is raised stop plate 222 such that a bottom surface 260 of product first layer 250 is generally aligned between a discharge platform 262 and push plate 214 of discharge assembly 40. Translation of discharge assembly 40 toward stack 22 pushes stack 22 from the elevated lift plate 62 out of stack area 56 and onto discharge platform 262. After ejection of stack 22 from stack area 56, lift plate 62 can be shuttled in downward direction 252 for subsequent receipt of layered product and repeated sequential operation of feed system 12 and stacking system 14.

The discharge assembly could discharge the stack 22 directly to a packaging machine such as a bundler or a case packer without further manipulation of the stack. In the illustrated embodiment, however, the stack 22 can be tipped or rotated 90 degrees by the tipping system 16 before or after being either bundled or discharged from packaging system 10. Preferably, for stacked product configuration where tipping may be an issue during progression of the stacked product from stacking system 14, tipping system 16 tips the stacked stack 22 prior to bundling or packaging of the product thereby mitigating the incidents of inadvertent tipping of stacked product.

FIGS. 17 through 23 show the progression of a multilayer or stacked product 261 into and through tipping system 16. It is understood that packaging system 10 is usable with a first paper product, such as residential use paper roll tissue product, like that shown in FIGS. 10 and 11, as well as another paper product such as a commercial paper roll product 270, like that shown in FIG. 19 and the product layering shown in FIGS. 17, 18, and 20-23. It should be readily appreciated that the overall width, depth, and height of stacked product will vary as a function of the dimension of the product as well as the desired number of rows, columns, and layers of the stacked product. Stacked product 261 is delivered from stack area 56 toward tipping system 16 by operation of the discharge assembly 40 with the aid of a stationary vertical side guide plate 294. As stacked product 261 progresses from stack area 56, if the product is not to be tipped prior to bundling, the stack interferes with a flexible wrap such as plastic or the like such that the plastic material generally surrounds stacked product 261. Preferably, for those product shapes and stack configurations that are tipped prior to bundling or being packed in a case, the oriented product stack does not interfere with the flexible wrap until after the tip or turn operation has completed.

Located above tipping system 16 is a drive system 280 that is connected to a number of movable arms 282, 284, 286 that wrap a plastic material about the oriented stacked product 261 as stacked product 261 progresses through the system via further displacement of plate 214 in the discharge direction. Tipping system 16 includes a selectively operable turn plate 290 that is movable relative to discharge platform 262 to effectuate a flip or turn of a stacked product 261 prior to bundling and discharge of the stacked product. As alluded to above, certain product stack configurations, such as 3½ inch wide by 6 inch diameter residential roll tissue products, are more readily susceptible to tipping of the stacked product as compared to stacked rolls of tissue product with larger diameters such as 9 inch and 12 inches rolls. As such, it is advantageous to manipulate the orientation of the stack to maintain the orientation of the product during the packaging and discharge processes. Preferably, turn plate 290 is configured to provide a 90 degree rotation of the stacked product with respect to the orientation of the stack as discharged from stacking system 14. Referring to FIGS. 20-23, the turn plate 290 is located adjacent a downstream end of the discharge platform 262 in the direction of stacked product conveyance. The turn plate 290 is pivotable to rotate stacked product 261 positioned thereon 90° and to deposit the stacked product back onto the discharge platform 262. Comparing FIGS. 22-23, the turn plate 290 cap then be returned to its horizontal position, and the arm 42 can be actuated to push the product stack 261 linearly from the discharge platform, onto the turn plate 290, and ultimately onto a product platform 292. It is appreciated that, should it not be desired to turn stacked product 261, turn plate 290 may be maintained in an initial position so as to not manipulate the orientation of the package during the product discharge sequence.

A product platform 292 is positioned downstream of tipping system 16 and is oriented or otherwise constructed to communicate the stacking for further processing and/or subsequent packaging and/or shipping operations. Preferably, product platform 292 is configured to deliver the bundled product by gravity to a position that does not interfere with the tipping and bundling of subsequent stacked and bundled product. System 16 preferably includes one or more of a heat and/or adhesive dispensing system for securing the plastic associated with the bundled product onto itself prior to discharge of the bundled product from system 16.

Packaging system 10 can stack and bundle a plurality of discrete products and can quickly and conveniently be configured for operation with products having different sizes and/or packaged products having different numbers of discrete product articles. Packaging system 10 includes a stacking system 12 that can tolerate different sized layers of products and can be efficiently configured for processing of such articles. Packaging system 10 can also be configured to rotate or tip a stack product if such a product orientation is desired. Accordingly, packaging system 10 provides improved system efficiency and reduced downtime associated with configuring a packaging system for operation with variable products.

I claim:

1. A method comprising:
    arranging a first sidewall and a second sidewall on opposed lateral sides of a stack area to define a width of the stack area and a stop plate at a rear edge of a stack area to define a depth of the stack area; then
    coordinating vertical movement of a lift plate and horizontal movement of a slide plate assembly to stack layers of products on the lift plate in the stack area to form a first multi-layer stack, each layer of the first stack having a first size and/or shape; then
    discharging the first stack from the stack area; then
    altering the position of at least one of the first sidewall, the second sidewall, and the stop plate to adjust at least one of the width and the depth of the stack area; and then
    while retaining first sidewall, the second sidewall, and the stop plate stationary so that the size and shape of the stack area remain constant,
    coordinating vertical movement of the lift plate and horizontal movement of the slide plate assembly to stack layers of products on the lift plate in the stack area to form a second multi-layer stack, each layer of the second stack having a second size and/or shape, and
    discharging the second stack from the stack area.

2. The method of claim 1, wherein the altering step comprises driving an adjustment assembly associated with at least one of the first sidewall, the second sidewall, and the stop plate.

3. The method of claim 1, further comprising moving the lift plate from a first position to a second position between positioning of respective layers of a respective stack in the stack area.

4. The method of claim 3, further comprising packaging more than one layer of the first stack or the second stack into a bundle or case.

5. The method of claim 4, further comprising turning the one of the first stack and the second stack ninety degrees before the stack is packaged.

6. The method of claim 5, wherein the turning step comprises pivoting a turn plate on which the one stack is supported to reorientate the one stack 90 degrees and to deposit the one stack on a discharge platform located adjacent an upstream edge of the turn plate.

* * * * *